(12) United States Patent
King et al.

(10) Patent No.: US 9,372,593 B2
(45) Date of Patent: Jun. 21, 2016

(54) USING A THREE-DIMENSIONAL MODEL TO RENDER A CURSOR

(75) Inventors: Nicholas V. King, San Jose, CA (US); Duncan Robert Kerr, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/306,831

(22) Filed: Nov. 29, 2011

(65) Prior Publication Data

US 2013/0135288 A1 May 30, 2013

(51) Int. Cl.
*G06F 3/0481* (2013.01)
*G06T 13/80* (2011.01)
*G06T 19/00* (2011.01)
*G06T 19/20* (2011.01)

(52) U.S. Cl.
CPC ........ *G06F 3/04812* (2013.01); *G06F 3/04815* (2013.01); *G06T 13/80* (2013.01); *G06F 3/0481* (2013.01); *G06T 19/00* (2013.01); *G06T 19/20* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,023,275 A | 2/2000 | Horvitz et al. | |
| 6,166,718 A | 12/2000 | Takeda | |
| 6,188,391 B1 | 2/2001 | Seely et al. | |
| 6,310,610 B1 | 10/2001 | Beaton et al. | |
| 6,313,836 B1 | 11/2001 | Russell, Jr. et al. | |
| 6,323,846 B1 | 11/2001 | Westerman et al. | |
| 6,642,947 B2 | 11/2003 | Feierbach | |
| 6,690,387 B2 | 2/2004 | Zimmerman et al. | |
| 6,971,071 B1 | 11/2005 | Impas et al. | |
| 7,000,180 B2 | 2/2006 | Balthaser | |
| 7,015,894 B2 | 3/2006 | Morohoshi | |
| 7,184,064 B2 | 2/2007 | Zimmerman et al. | |
| 7,439,975 B2 * | 10/2008 | Hsu ............................. | 345/426 |
| 7,663,607 B2 | 2/2010 | Hotelling et al. | |
| 7,975,241 B2 | 7/2011 | Rosen et al. | |
| 8,479,122 B2 | 7/2013 | Hotelling et al. | |

(Continued)

FOREIGN PATENT DOCUMENTS

| | | |
|---|---|---|
| GB | 2238215 A | 5/1991 |
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Xiao Wu
*Assistant Examiner* — Steven Elbinger
(74) *Attorney, Agent, or Firm* — Morrison & Foerster LLP (57) ABSTRACT

In some implementations, a cursor can be rendered based on a three-dimensional model. In some implementations, the three-dimensional cursor can be manipulated to change the orientation of the three-dimensional cursor based on the context of the cursor. In some implementations, parameters associated with the three-dimensional model can be manipulated based on the context of the three-dimensional cursor to change the appearance of the cursor.

21 Claims, 6 Drawing Sheets

(56) References Cited

U.S. PATENT DOCUMENTS

| | | | |
|---|---|---|---|
| 2006/0026521 | A1 | 2/2006 | Hotelling et al. |
| 2006/0197753 | A1 | 9/2006 | Hotelling |
| 2008/0288895 | A1 | 11/2008 | Hollemans et al. |
| 2009/0083628 | A1* | 3/2009 | Fitzmaurice et al. ......... 715/711 |
| 2009/0109244 | A1 | 4/2009 | Conner et al. |
| 2009/0140978 | A1* | 6/2009 | Louch ........................... 345/157 |
| 2010/0083165 | A1 | 4/2010 | Andrews et al. |
| 2011/0167353 | A1 | 7/2011 | Grosz et al. |
| 2011/0225538 | A1* | 9/2011 | Oyagi et al. .................. 715/781 |
| 2011/0289461 | A1* | 11/2011 | Jancourtz ..................... 715/856 |
| 2012/0157203 | A1* | 6/2012 | Latta et al. ...................... 463/32 |
| 2013/0135309 | A1 | 5/2013 | King et al. |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Jul. 18, 2013, for U.S. Appl. No. 13/306,803, filed Nov. 29, 2011, 16 pages.

Anonymous. (2011). Stardock CursorFX Settings, *Stardock*, located at http://www.stardock.com/products/cursorfx/help/settings/html, last visited on Sep. 19, 2011, six pages.

Final Office Action mailed Mar. 7, 2014, for U.S. Appl. No. 13/306,803, filed Nov. 29, 2011, 14 pages.

Plenacoste et al. (1998). "The Role of Static and Dynamic Shadows in a Three-Dimensional Computer Environment," *Proceedings of WebNet 98—World Conference on the WWW and Internet & Intranet*, five pages.

CN Search Report completed Mar. 26, 2015, for CN Patent Application No. 201210473228.3, filed Sep. 28, 2012, two pages.

Non-Final Office Action mailed Nov. 10, 2014, for U.S. Appl. No. 13/306,803, filed Nov. 29, 2011, 14 pages.

Final Office Action mailed May 22, 2015, for U.S. Appl. No. 13/306,803, filed Nov. 29, 2011, nine pages.

Notice of Allowance mailed Nov. 27, 2015, for U.S. Appl. No. 13/306,803, filed Nov. 29, 2011, eight pages.

* cited by examiner

USING A THREE-DIMENSIONAL MODEL TO RENDER A CURSOR

TECHNICAL FIELD

The disclosure generally relates to graphical user interfaces and cursors.

BACKGROUND

Many computing devices employ an input device in conjunction with an on-screen cursor to allow a user to select and manipulate user interface objects. Sometimes the cursor is context-sensitive. The cursor might appear as an arrow when positioned over icons, as a pointing hand when positioned over a link on a web page, or as a text insertion cursor when positioned over text. Transitions between different cursor appearances are instantaneous and are performed by replacing one cursor image (e.g., an image of an arrow) with another cursor image (e.g., an image of a hand) based on the cursor context. This approach can be visually jarring and can be confusing to the user.

SUMMARY

In some implementations, a cursor can be rendered based on a three-dimensional model. In some implementations, the three-dimensional model can be manipulated to change the orientation, size and/or shape of the cursor based on the context of the cursor. In some implementations, parameters associated with the three-dimensional model can be manipulated based on the context of the cursor to change the appearance of the cursor.

Particular implementations provide at least the following advantages: By rendering the cursor using a three-dimensional model, the cursor can be rotated, scaled and even morphed or deformed into different shapes. The three-dimensional cursor can be made to feel much more like a single unified object.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
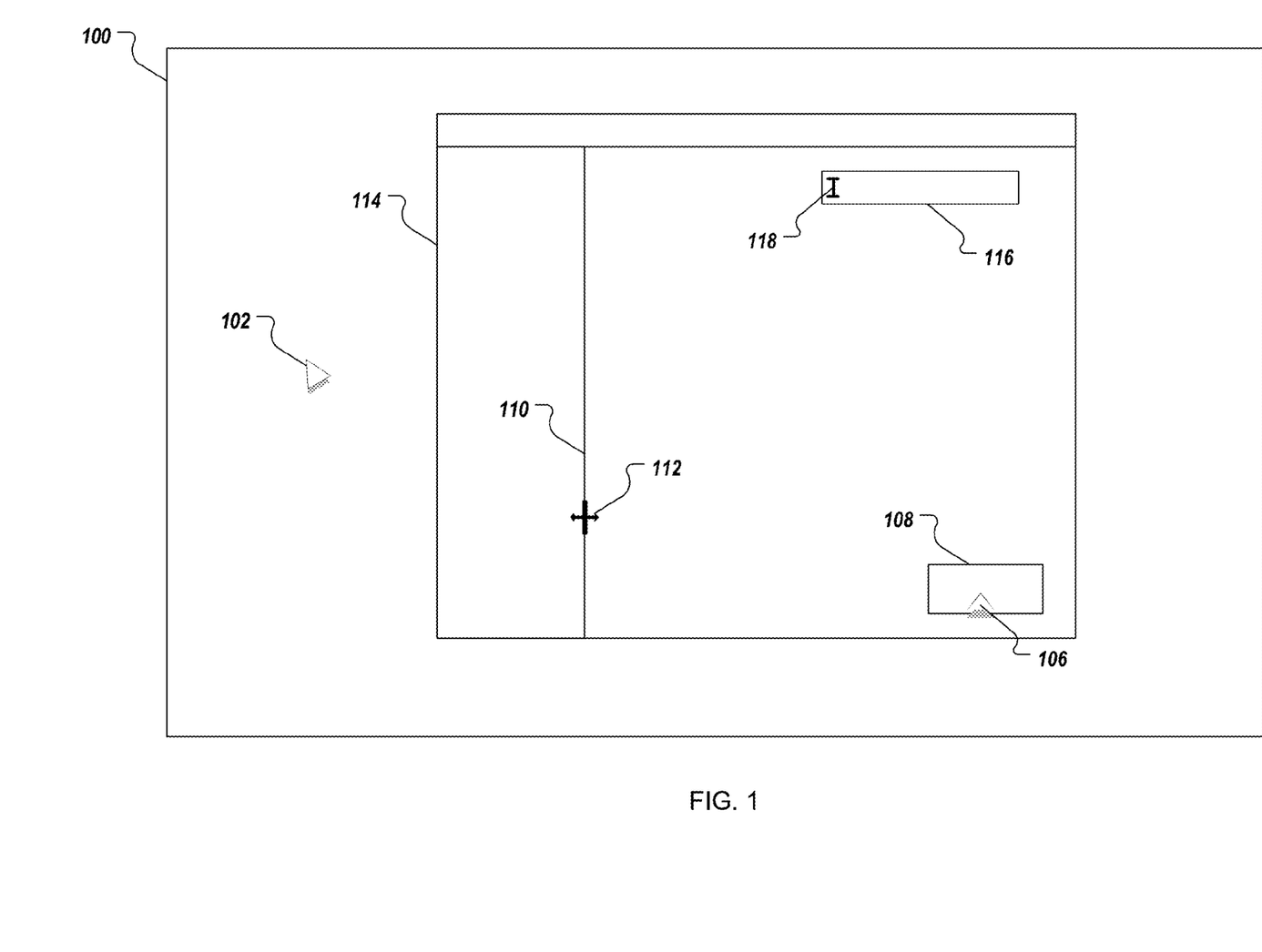
FIG. 1 illustrates an example user interface having a cursor that is modified based on context.

FIG. 1 illustrates an example user interface 100 having a cursor that is modified based on context. For example, user interface 100 can be a user interface displayed on a display device coupled to a computing device. Cursor 102 can be implemented by the operating system software of the computing device, for example. In some implementations, cursor 102 can be generated based upon a three-dimensional model. For example, cursor 102 can be rendered based on a three-dimensional model of any object having any shape. The three-dimensional arrow cursor illustrated by FIG. 1 is merely an example of one of the many forms cursor 102 can take. The three-dimensional model can be generated using a variety of computer three-dimensional modeling techniques. The three-dimensional model can be generated using polygonal modeling techniques (e.g., using a polygonal mesh), curve modeling, parametric modeling, surface modeling and/or digital sculpting, for example. The three-dimensional model can be generated using any three-dimensional modeling software (e.g., any computer aided design software).

In some implementations, a user can configure cursor 102 so that cursor 102 is rendered based on a user-selected three-dimensional model. For example, the user can generate a three-dimensional model using modeling software, save the three-dimensional model to a file (e.g., a digital asset exchange formatted file), and provide the file to the operating system to cause the user-generated three-dimensional model to be rendered into cursor 102. In some implementations, the user can select an operating system provided (e.g., predefined) three-dimensional model to customize cursor 102 according to the user's tastes.

In some implementations, as cursor 102 is moved about user interface 100, the appearance of cursor 102 can be changed based on the cursor's context. For example, a user can manipulate an input device (e.g., a mouse, track pad, touch pad, track ball, arrow keys, joy stick, touch sensitive interface, etc.) to cause cursor 102 to move around interface 100. As cursor 102 is moved around interface 100, the context of cursor 102 can change. For example, cursor 102 can pass near or over user interface objects. In some implementations, the appearance cursor 102 can be adjusted based on the proximity of cursor 102 to other user interface objects. In some implementations, the context of cursor 102 can include additional or simultaneous user input. For example, cursor context can include keyboard input (e.g., simultaneous key input) that causes a modification to the cursor's operation and the appearance of cursor 102 can be modified to represent the change in cursor operation.

In some implementations, cursor 102 can have a default appearance. For example, cursor 102 can be displayed with a default orientation when cursor 102 is not over or near a user interface object that can be manipulated. A default cursor orientation can be displayed when cursor 102 is over an open space on user interface 104, for example. The default orientation of cursor 102 can be a 45 degree tilt to the left (or right), as illustrated by FIG. 1, for example. In some implementations, the default orientation of cursor 102 can be adjusted to left or right handed users. For example, for a computing device configured for a right handed user, cursor 102 can have a left tilt orientation. For computing devices configured for a left handed user, cursor 102 can have a right tilt orientation.

In some implementations, the cursor can display an object selection orientation. For example, when cursor 102 is placed over an object that can be selected by the user (e.g., a button, icon, link, etc.), the appearance of cursor 102 can be modified to indicate that the cursor is over the selectable object. Cursor 102 can be parametrically adjusted to transform into selection cursor 106 when cursor 102 is positioned over button 108, for example, causing cursor 102 to appear to rotate in three-dimensions (e.g., horizontally, vertically, perpendicularly from the users perspective) until cursor 102 takes on the appearance of cursor 106.

In some implementations, the cursor can be morphed into an adjustment cursor. For example, if cursor 102 is moved to adjustable pane separator 110, then cursor 102 can be morphed into adjustment cursor 112. Pane separator 110 can be moved left or right, for example, to adjust the sizes of the adjacent user interface areas using cursor 112. By morphing cursor 102 into adjustment cursor 112, the user can be notified that cursor 102 has been moved into a position on user interface 114 that allows for adjusting pane separator 110. In some implementations, cursor 102 can be rotated about one or more axes and morphed into adjustment cursor 112. For example, cursor 102 can be rotated until only an edge of cursor 102 is displayed in a vertical (or horizontal) orientation. Then, double arrows showing the direction of possible adjustment (left-right, up-down) can be grown (e.g., animated, extruded) out of the cursor, for example. For example, the double arrows can be extruded from one or more surfaces of cursor 102. The user can then use the cursor to move the pane separator and adjust the size of the adjacent user interface panes.

In some implementations, the cursor can be morphed into a text cursor. For example, when cursor 102 is positioned over text box 116, cursor can be morphed into text cursor 118. Similarly to adjustment cursor 112, text cursor 118 can be displayed by manipulating cursor 102. Cursor 102 can be rotated about one or more axes until cursor 102 shows only an edge, for example. Then, cursor 102 can be morphed such that horizontal (or vertical) lines extend from the ends of the cursor until cursor 102 takes on the appearance of text cursor 118.

FIGS. 2A-J illustrate examples of three-dimensional cursor manipulation. In some implementations, the three-dimensional cursor can be manipulated and/or adjusted based on the context of the cursor. For example, the three-dimensional cursor can be rotated about one or more axes and morphed or altered to change the cursor's shape. Three-dimensional modeling techniques can be used to manipulate or adjust the cursor. For example, instead of changing the appearance of the cursor by replacing one cursor image with another cursor image, the appearance of the three-dimensional cursor described herein can be manipulated or adjusted by changing the parameters of the three-dimensional model upon which the three-dimensional cursor is based. The parameters of the three-dimensional model (e.g., dimensions, orientation, etc.) can be adjusted to change the orientation of the three-dimensional cursor and/or change the size and shape of the three-dimensional cursor, for example.

Figure 2A:
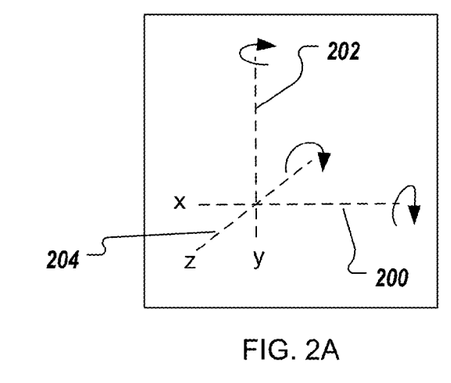
FIGS. 2A-J illustrate examples of manipulating a three-dimensional cursor.

FIG. 2A illustrates three axis cursor rotation relative to a user interface. In some implementations, a three-dimensional cursor can be rotated about a horizontal axis 200 (e.g., x-axis), a vertical axis 202 (e.g., y-axis), and/or a perpendicular axis 204 (e.g., z-axis) in the user interface. The perpendicular axis 204 can be perpendicular to the user interface, for example. The axes 200, 202, and 203 can be relative to the user interface or relative to the three-dimensional cursor. In other words, the three-dimensional cursor can be made to pitch, yaw and roll (borrowing terms from flight dynamics) within the user interface space based on the context of the cursor. In some implementations, the three-dimensional cursor can be rotated about a point on the cursor. For example, an arrow cursor can be rotated about a point at the tip of the cursor. In other words, the intersection of x, y and z axes can be located at the point of the arrow cursor. Moreover, the size and shape (e.g., dimensions) of the cursor can be adjusted based on the context of the cursor. While manipulation of the cursor is described with reference to x, y, and z axes, other axes having various orientations with respect to the three-dimensional cursor and/or user interfaces may be used. For example, if the axes are associated with the cursor, then the orientation of the axes can change as the cursor changes orientation.

Figure 2B:
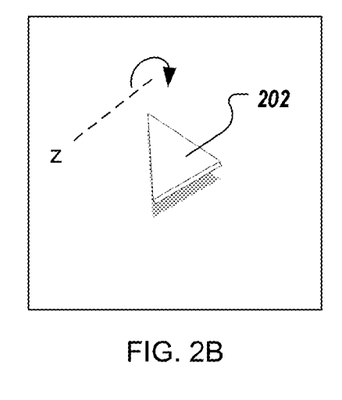

FIG. 2B illustrates cursor rotation about the z-axis. For example, cursor 202 can rotate about the z-axis parallel to the user interface (e.g., parallel to the x-axis or y-axis). For example, cursor 202 can be rotated clockwise within the x-y plane until cursor 202 assumes the orientation of cursor 204 of FIG. 2C.

Figure 2C:
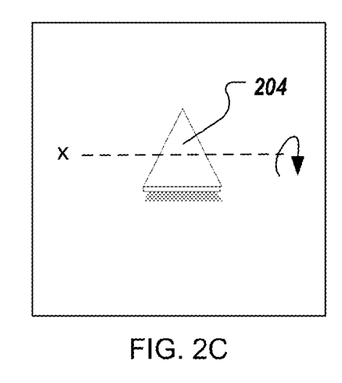

FIG. 2C illustrates cursor rotation about the x-axis. For example, cursor 204 can rotate about the x-axis so as to appear to rotate in depth on the user interface. For example, when the cursor rotates about the x-axis, the tip of the cursor can appear to move deeper (e.g., farther away from the user) into the user interface and/or the tail of the cursor can appear to move closer to the user. Rotation of cursor 204 about the x-axis can result in cursor 204 assuming the orientation of cursor 206 of FIG. 2D.

Figure 2D:
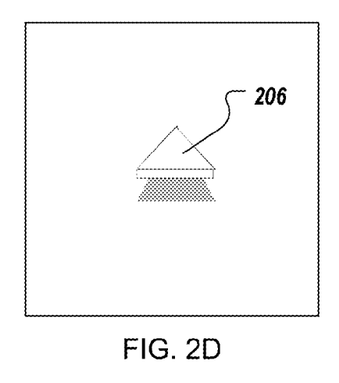

FIG. 2D illustrates the selection cursor described with reference to FIG. 1. In some implementations, when the three-dimensional cursor is placed over a selectable object (e.g., a button, hyperlink, menu, etc.) the cursor can assume the orientation and appearance of cursor 206. For example, cursor 206 can appear to be pointing at the selectable object. In some implementations, when input is received (e.g., pressing a mouse button, touch input, etc.) to select a selectable object, cursor 206 can be adjusted to acknowledge the input. For example, when the input is received to select an object, cursor 206 may be rotated about the x-axis so that it appears as if the tip of the cursor is touching down on the selected object. Once the input has ceased (e.g., the mouse button is released, touch input has ceased), the tip of the cursor can be rotated away from the selected object to indicate that input is no longer being received.

Figure 2E:
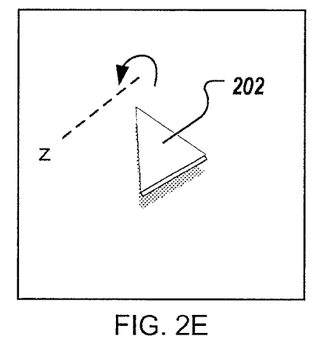

FIG. 2E illustrates cursor rotation about the z-axis. For example, cursor 202 can rotate about the z-axis parallel to the user interface (e.g., parallel to the x-axis or y-axis). For example, cursor 202 can be rotated counter-clockwise within the x-y plane until cursor 202 assumes the orientation of cursor 208 of FIG. 2F.

Figure 2F:
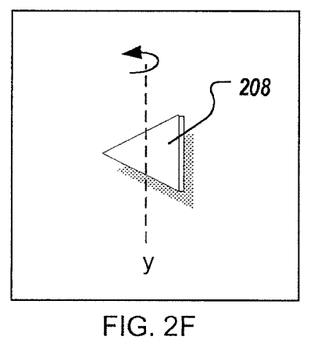
Figure 2G:
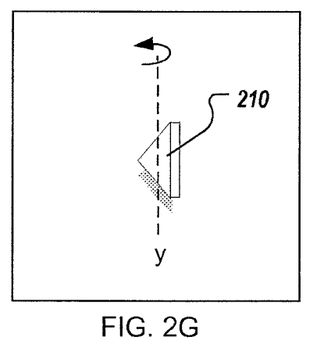

FIGS. 2F and 2G illustrate cursor rotation about the y-axis. For example, cursor 208 can be rotated about the y-axis such that the tip of the cursor 208 rotates deeper (e.g., away from the user) into the user interface and/or the tail of the cursor 208 rotates toward the user, as illustrated by cursor 210 of FIG. 2G. Cursor 210 can continue to rotate about the z-axis until only the edge of cursor 210 is displayed, as illustrated cursor 212 of FIG. 2H.

Figure 2H:
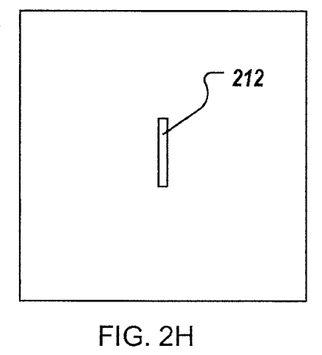

FIG. 2H illustrates an edge view orientation of cursor 202. For example, the edge-view orientation of cursor 202 (e.g., cursor 212) can be displayed when the cursor is over a text input area of a user interface. Thus, in some implementations, cursor 212 can be a text cursor. In some implementations, cursor 212 can be modified to provide context information to a user. For example, cursor 212 can be morphed into cursor 214 of FIG. and/or cursor 216 of FIG. 2J.

Figure 2I:
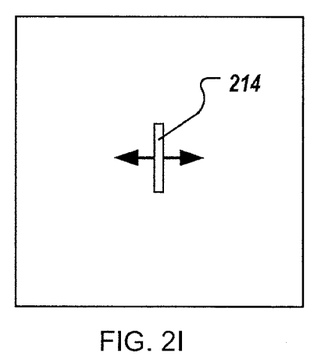

In some implementations, arrows can be extruded from the surfaces of cursor 212 to generate cursor 214. For example, arrows can be grown from the surfaces of cursor 212 to generate cursor 214 when cursor 212 is positioned over an adjustable window pane separator. The arrows can indicate directions in which the adjustable window pane separator can be moved.

Figure 2J:
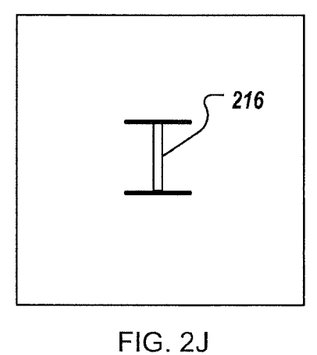

In some implementations, bars can be extruded from the ends/edges of cursor 212. For example, horizontal bars can be grown from the top and bottom end of cursor 212 to generate cursor 216 when cursor 212 is positioned over a text input area of a user interface to indicate to the user that text can be entered.

In some implementations, the shadow associated with a three-dimensional cursor can be adjusted based on the orientation and shape of the cursor. For example, a three-dimensional model can present different shapes based on the orientation of the model and the perspective of the user. Similarly, a three-dimensional model can cast shadows of different shapes based on the orientation of the model and the position of the light source. Thus, when the three-dimensional cursor (based on a three-dimensional model) changes orientation, size and/or shape, the shadow associated with the three-dimensional cursor can change size and shape to reflect the changes in the cursor.

Figure 3:
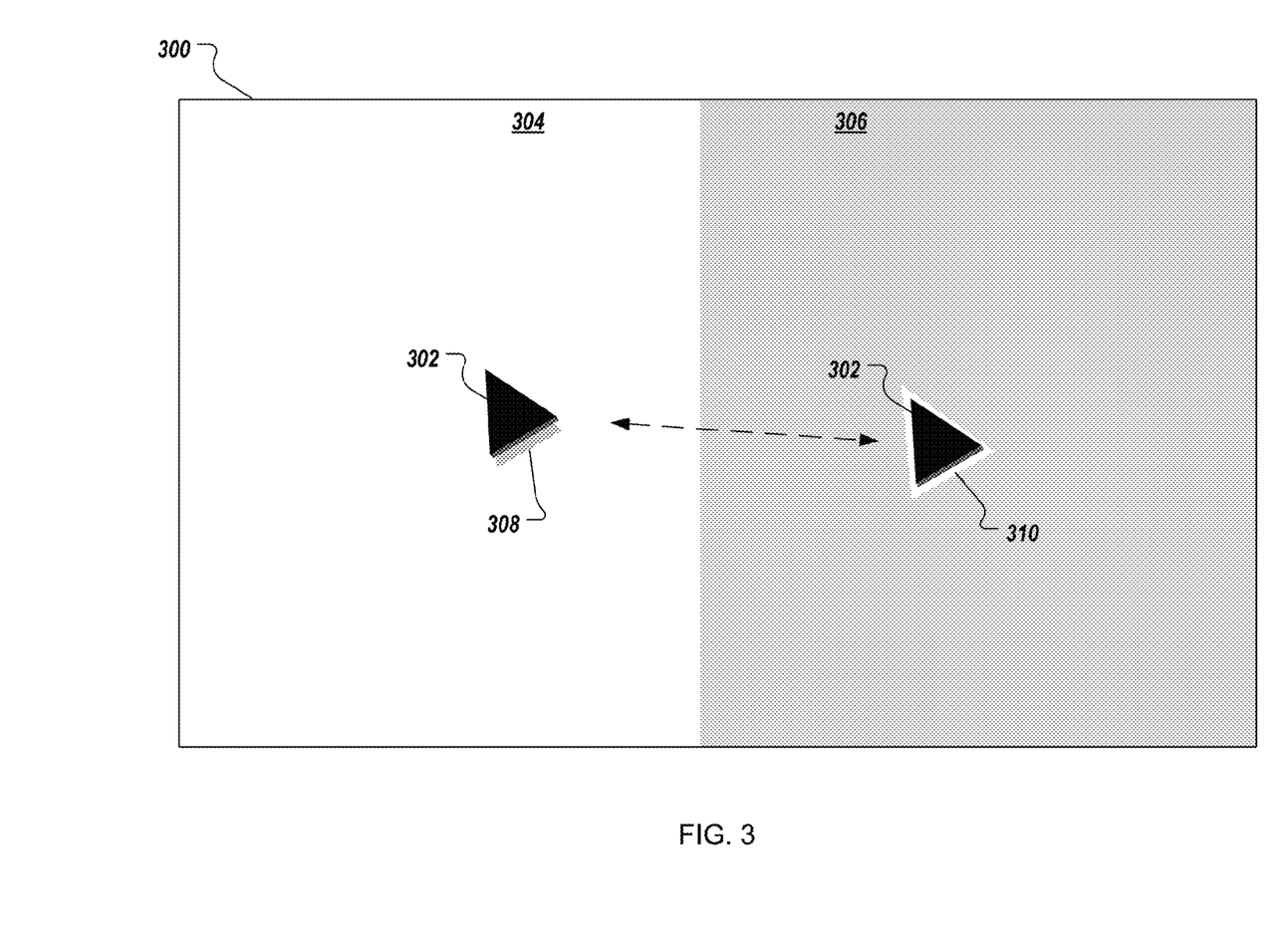
FIG. 3 illustrates an example user interface that includes cursor highlighting.

FIG. 3 illustrates an example user interface 300 that includes cursor highlighting. For example, cursor highlighting can improved the visibility of the cursor making the cursor easier to find, see and track on a user interface. In some implementations, cursor 302 can be highlighted to make cursor 302 easier to find, see and track on user interface 300. For example, user interface 300 can have areas of different color and intensity. User interface 300 can have a light area 304 and a dark area 306, for example. As cursor 302 is moved from light area 304 to dark area 306, the visibility of cursor 302 can change. For example, a white cursor on a white background can be difficult for a user to see. A dark cursor on a dark background can be difficult for a user to see. In some implementations, the color of the user interface over which cursor 302 is positioned (e.g., background color) can be detected and cursor 302 can be highlighted to make the cursor more visible to a user. For example, a shadow 308 can be generated for cursor 302 to make cursor 302 stand out on white backgrounds. A glowing surround 310 can be generated for cursor 302 to make cursor 302 stand out on dark backgrounds.

In some implementations, as cursor 302 is moved between different backgrounds the highlighting (e.g., shadow, glow, color outline, etc.) associated with the cursor can change. For example, as cursor 302 is moved from light background 304 to dark background 306, the highlighting of cursor 302 can change from shadow 308 to glowing surround 310. For example, glowing surround 310 can be an area of any pixel color or intensity value that highlights, outlines or otherwise makes cursor 302 visible on a dark background.

In some implementations, cursor highlighting can be based on a comparison of the color of the cursor and the color of the background. For example, if a light colored cursor is over a dark background, cursor highlighting can be disabled (e.g., not displayed) because the light colored cursor already stands out visually on the dark background. Likewise, if a dark colored cursor is displayed over a light background, cursor highlighting can be disabled.

In some implementations, cursor highlighting can include animations. For example, a sparkler or twinkling effect can be displayed to more quickly draw the user's eye to cursor 302. Other dynamic animations can be displayed to catch a user's attention and draw the user's eye to cursor 302.

Figure 4:
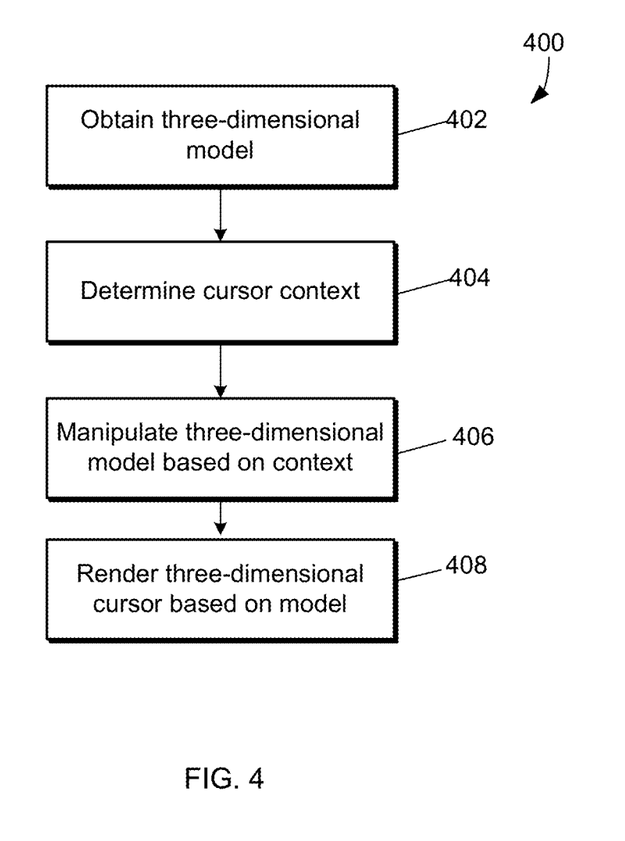
FIG. 4 is flow diagram of an example process for using a three-dimensional model to render a cursor.

FIG. 4 is flow diagram of an example process 400 for using a three-dimensional model to render a cursor. At step 402, a three-dimensional model is obtained. In some implementations, the three-dimensional model is obtained from a default set of three-dimensional models provided with the operating system of a computing device. In some implementations, the three-dimensional model is provided by a user. For example, the user can generate a three-dimensional model and upload the model to be used as the three-dimensional cursor. In some implementations, a software application can provide an application-specific three-dimensional model to be rendered into a cursor for interacting with the specific application.

At step 404, the context of the three-dimensional cursor is determined. In some implementations, location of the cursor can be associated with a context. For example, determining the context can include determining when the cursor is over a selectable or interactive object (e.g., a button, toggle, menu item, hyperlink, etc.).

At step 406, the three-dimensional model is manipulated based on the context. In some implementations, the orientation, size, shape, color, and other characteristics of the three-dimensional model can be changed based on the context of the cursor. For example, unlike typical cursors that merely replace one two-dimensional image with another two dimensional image to indicate cursor context, the appearance of the three-dimensional cursor described herein can be modified by adjusting the parameters of the three-dimensional model upon which the cursor is based and then rendering the three-dimensional model into the three-dimensional cursor. By parametrically adjusting the three-dimensional model and rendering the model into the cursor, the transitions between cursor orientations and cursor shapes can be more fluid, lifelike and more visually appealing to the user.

At step 408, a three-dimensional cursor is rendered based on the three-dimensional model. In some implementations, the three-dimensional model obtained at step 402 and manipulated at step 406 is rendered into the cursor. For example, the three-dimensional model can be rendered into the cursor in real-time and based on the context associated with the location of the cursor.

Example System Architecture

Figure 5:
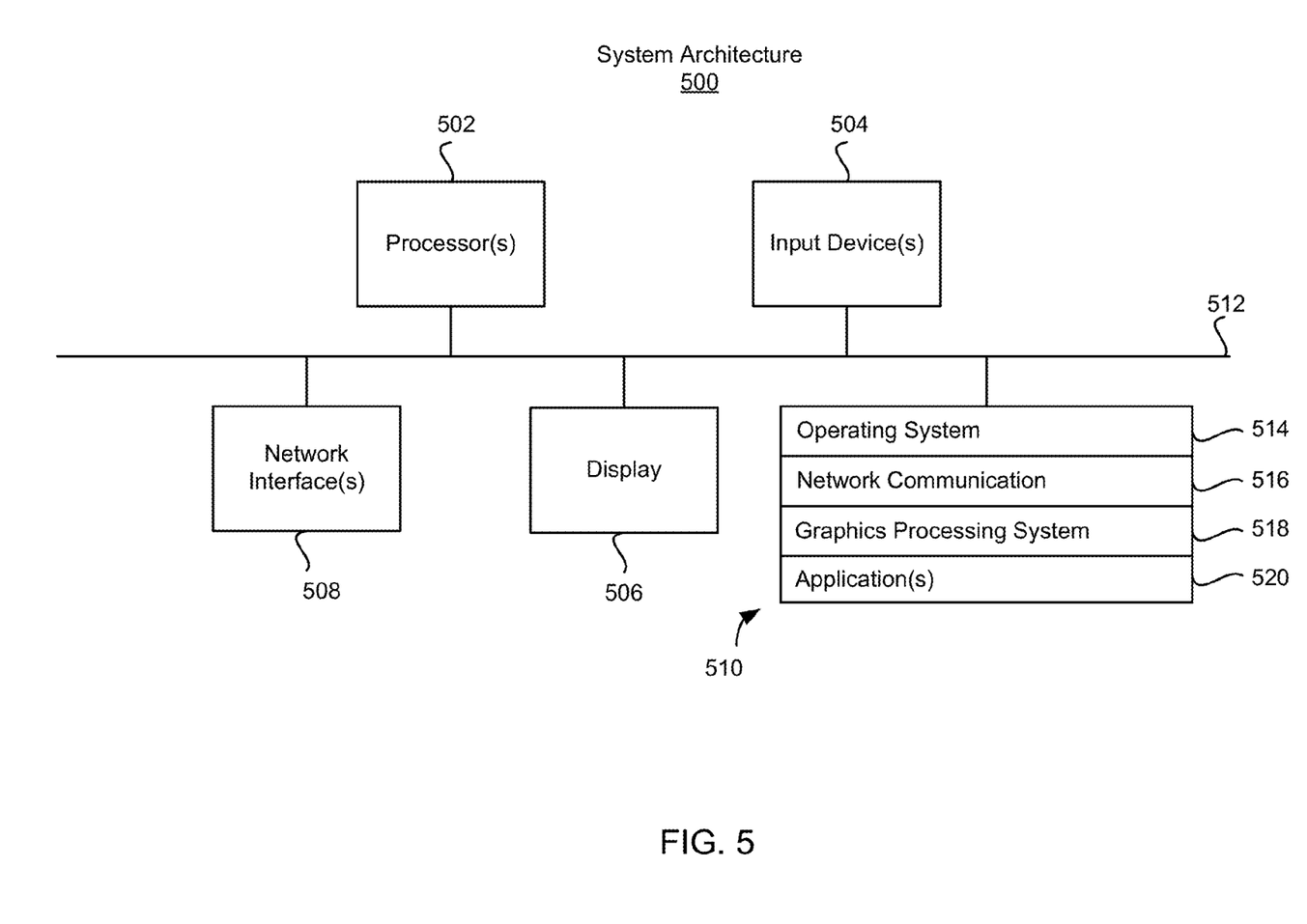
FIG. 5 is a block diagram of an exemplary system architecture implementing the features and processes of FIGS. 1-4.

FIG. 5 is a block diagram of an exemplary system architecture implementing the features and processes of FIGS. 1-4. The architecture 500 can be implemented on any electronic device that runs software applications derived from compiled instructions, including without limitation personal computers, servers, smart phones, media players, electronic tablets, game consoles, email devices, etc. In some implementations, the architecture 500 can include one or more processors 502, one or more input devices 504, one or more display devices 506, one or more network interfaces 508 and one or more computer-readable mediums 510. Each of these components can be coupled by bus 512.

Display device 506 can be any known display technology, including but not limited to display devices using Liquid Crystal Display (LCD) or Light Emitting Diode (LED) technology. Processor(s) 502 can use any known processor technology, including but are not limited to graphics processors and multi-core processors. Input device 504 can be any known input device technology, including but not limited to a keyboard (including a virtual keyboard), mouse, track ball, and touch-sensitive pad or display. Bus 512 can be any known internal or external bus technology, including but not limited to ISA, EISA, PCI, PCI Express, NuBus, USB, Serial ATA or FireWire. Computer-readable medium 510 can be any medium that participates in providing instructions to processor(s) 502 for execution, including without limitation, non-volatile storage media (e.g., optical disks, magnetic disks, flash drives, etc.) or volatile media (e.g., SDRAM, ROM, etc.).

Computer-readable medium 510 can include various instructions 514 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 can establish and maintain network connections (e.g., software for implementing communication protocols, such as TCP/IP, HTTP, Ethernet, etc.).

A graphics processing system 518 can include instructions that provide graphics and image processing capabilities. For example, the graphics processing system 518 can render a three-dimensional cursor based on a three-dimensional model as described with reference to FIGS. 1-4. Application(s) 520 can be an application that uses or implements the three dimensional cursor described in reference to FIGS. 1-4. The three-dimensional cursor can also be implemented in operating system 514.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
   concurrently displaying, on a display:
     a first cursor that is represented by a three-dimensional model that includes a first face and a second face, wherein the first face occupies a larger area on the display than an area occupied by the second face on the display;
     a first user interface object associated with a first cursor context; and
     a second user interface object associated with a second cursor context;
   while the first cursor, the first user interface object, and the second user interface object are concurrently displayed, receiving input moving the first cursor from the first user interface object to the second user interface object; and
   in response to the input, transitioning the first cursor to a second cursor in accordance with the second cursor context associated with the second user interface object;
   wherein the transitioning includes:
     rotating the first cursor such that, after the rotation of the first cursor, the second face occupies a larger area on the display than an area occupied by the first face on the display; and
     while maintaining display of the second face after the rotation of the first cursor, morphing the first cursor into the second cursor, the morphing including an extrusion, wherein the second cursor includes the second face of the first cursor.

2. The method of claim 1, wherein displaying the first cursor includes generating a shadow for the first cursor.

3. The method of claim 1, further comprising: detecting when the first cursor and the second user interface object are substantially co-located; determining a type associated with the second user interface object; and manipulating the first cursor based on the type.

4. The method of claim 3, wherein manipulating the first cursor includes rotating the first cursor.

5. The method of claim 3, wherein manipulating the first cursor includes scaling the first cursor.

6. The method of claim 3, wherein manipulating the first cursor includes morphing the first cursor into another shape.

7. The method of claim 1, wherein displaying the first cursor includes rendering the three-dimensional model in real-time.

8. A non-transitory computer-readable medium including one or more sequences of instructions which, when executed by one or more processors, causes:
concurrently displaying, on a display:
a first cursor that is represented by a three-dimensional model that includes a first face and a second face, wherein the first face occupies a larger area on the display than an area occupied by the second face on the display;
a first user interface object associated with a first cursor context; and
a second user interface object associated with a second cursor context;
while the first cursor, the first user interface object, and the second user interface object are concurrently displayed, receiving input moving the first cursor from the first user interface object to the second user interface object; and
in response to the input, transitioning the first cursor to a second cursor in accordance with the second cursor context associated with the second user interface object;
wherein the transitioning includes:
rotating the first cursor such that, after the rotation of the first cursor, the second face occupies a larger area on the display than an area occupied by the first face on the display; and
while maintaining display of the second face after the rotation of the first cursor, morphing the first cursor into the second cursor, the morphing including an extrustion, wherein the second cursor includes the second face of the first cursor.

9. The computer-readable medium of claim 8, wherein the instructions that cause displaying the first cursor include instructions that cause generating a shadow for the first cursor.

10. The computer-readable medium of claim 8, wherein the instructions cause: detecting when the first cursor and the second user interface object are substantially co-located; determining a type associated with the second user interface object; and manipulating the first cursor based on the type.

11. The computer-readable medium of claim 8, wherein the instructions that cause manipulating the first cursor include instructions that cause rotating the first cursor.

12. The computer-readable medium of claim 8, wherein the instructions that cause manipulating the first cursor include instructions that cause scaling the first cursor.

13. The computer-readable medium of claim 8, wherein the instructions that cause manipulating the first cursor include instructions that cause morphing the first cursor into another shape.

14. The computer-readable medium of claim 8, wherein the instructions that cause displaying the first cursor include instructions that cause rendering the three-dimensional model in real-time.

15. A system comprising: one or more processors; and a computer-readable medium including one or more sequences of instructions which, when executed by the one or more processors, causes:
concurrently displaying, on a display:
a first cursor that is represented by a three-dimensional model that includes a first face and a second face, wherein the first face occupies a larger area on the display than an area occupied by the second face on the display;
a first user interface object associated with a first cursor context; and
a second user interface object associated with a second cursor context;
while the first cursor, the first user interface object, and the second user interface object are concurrently displayed, receiving input moving the first cursor from the first user interface object to the second user interface object; and
in response to the input, transitioning the first cursor to a second cursor in accordance with the second cursor context associated with the second user interface object;
wherein the transitioning includes:
rotating the first cursor such that, after the rotation of the first cursor, the second face occupies a larger area on the display than an area occupied by the first face on the display; and
while maintaining display of the second face after the rotation of the first cursor, morphing the first cursor into the second cursor, the morphing including an extrustion, wherein the second cursor includes the second face of the first cursor.

16. The system of claim 15, wherein the instructions that cause displaying the first cursor include instructions that cause generating a shadow for the first cursor.

17. The system of claim 15, wherein the instructions cause: detecting when the first cursor and the second user interface object are substantially co-located; determining a type associated with the second user interface object; and manipulating the first cursor based on the type.

18. The system of claim 15, wherein the instructions that cause manipulating the first cursor include instructions that cause rotating the first cursor.

19. The system of claim 15, wherein the instructions that cause manipulating the first cursor include instructions that cause scaling the first cursor.

20. The system of claim 15, wherein the instructions that cause manipulating the first cursor include instructions that cause morphing the first cursor into another shape.

21. The system of claim 15, wherein the instructions that cause displaying the first cursor include instructions that cause rendering the three-dimensional model in real-time.

* * * * *